(12) United States Patent
Lee et al.

(10) Patent No.: US 11,641,013 B2
(45) Date of Patent: May 2, 2023

(54) NEGATIVE ACTIVE MATERIAL FOR RECHARGEABLE LITHIUM BATTERY AND RECHARGEABLE LITHIUM BATTERY INCLUDING SAME

(71) Applicant: Samsung SDI Co., Ltd., Yongin-si (KR)

(72) Inventors: Eunjoo Lee, Yongin-si (KR); Narae Kim, Yongin-si (KR); Joongho Moon, Yongin-si (KR); Sunil Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 59 days.

(21) Appl. No.: 17/190,802

(22) Filed: Mar. 3, 2021

(65) Prior Publication Data
US 2021/0280855 A1    Sep. 9, 2021

(30) Foreign Application Priority Data

Mar. 3, 2020   (KR) .................. 10-2020-0026661

(51) Int. Cl.
*H01M 4/36*    (2006.01)
*H01M 4/38*    (2006.01)
(Continued)

(52) U.S. Cl.
CPC .............. *H01M 4/366* (2013.01); *H01M 4/38* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 5,419,883 A | 5/1995 | Ogawa et al. | |
| 6,139,990 A | 10/2000 | Kubota et al. | |
| (Continued) | | | |

FOREIGN PATENT DOCUMENTS

| | | | |
|---|---|---|---|
| CN | 1237003 A | 12/1999 | |
| CN | 1516305 A | 7/2004 | |
| (Continued) | | | |

OTHER PUBLICATIONS

Chinese Office Action, with English translation, dated Jun. 17, 2022, issued in Chinese Patent Application No. 201910841285.4 (19 pages).

(Continued)

*Primary Examiner* — Wyatt P McConnell
(74) *Attorney, Agent, or Firm* — Lewis Roca Rothgerber Christie LLP

(57) ABSTRACT

A rechargeable lithium battery includes a negative active material including: a secondary particle including a core in which a plurality of primary particles are agglomerated, the primary particles including a natural graphite; and a coating layer including amorphous carbon and surrounding the core, wherein a Raman peak intensity ratio of a D peak (1350 $cm^{-1}$ to 1370 $cm^{-1}$) to a D' peak (1570 $cm^{-1}$ to 1620 $cm^{-1}$) ($I_D/I_{D'}$) of the negative active material is about 3.2 to about 3.8, and a lattice constant La of the negative active material is about 30 nm to about 45 nm.

10 Claims, 7 Drawing Sheets

(51) Int. Cl.
*H01M 10/0525* (2010.01)
*H01M 4/02* (2006.01)

(56) References Cited

U.S. PATENT DOCUMENTS

| | | | |
|---|---|---|---|
| 6,482,547 | B1 | 11/2002 | Yoon et al. |
| 2002/0197534 | A1 | 12/2002 | Fukuda et al. |
| 2004/0137328 | A1 | 7/2004 | Kim et al. |
| 2005/0266314 | A1 | 12/2005 | Sheem et al. |
| 2006/0062717 | A1 | 3/2006 | Tokuoka et al. |
| 2010/0285359 | A1 | 11/2010 | Hwang et al. |
| 2011/0195313 | A1 | 8/2011 | Lee et al. |
| 2011/0281180 | A1 | 11/2011 | Kim et al. |
| 2013/0309578 | A1 | 11/2013 | Umeno et al. |
| 2014/0178762 | A1* | 6/2014 | Lee ............... H01M 4/133 429/231.4 |
| 2015/0180019 | A1 | 6/2015 | Lee et al. |
| 2015/0318545 | A1 | 11/2015 | Satow et al. |
| 2015/0349332 | A1 | 12/2015 | Azami et al. |
| 2017/0062823 | A1 | 3/2017 | Yamaguchi et al. |
| 2017/0162869 | A1 | 6/2017 | Shim et al. |
| 2017/0187041 | A1 | 6/2017 | Yamada et al. |
| 2017/0352868 | A1 | 12/2017 | Zhamu et al. |
| 2017/0352871 | A1 | 12/2017 | Kim et al. |
| 2019/0198863 | A1 | 6/2019 | Lee |
| 2019/0229325 | A1 | 7/2019 | Ahn et al. |
| 2019/0355971 | A1 | 11/2019 | Kim |
| 2020/0083536 | A1 | 3/2020 | Lee et al. |
| 2020/0148545 | A1 | 5/2020 | Spahr et al. |
| 2020/0185720 | A1 | 6/2020 | Lee et al. |

FOREIGN PATENT DOCUMENTS

| | | | |
|---|---|---|---|
| CN | 1848489 | A | 10/2006 |
| CN | 102244251 | A | 11/2011 |
| CN | 103560233 | A | 2/2014 |
| CN | 106486671 | A | 3/2017 |
| CN | 106663808 | A | 5/2017 |
| JP | 7-300313 | A | 11/1995 |
| JP | 10-312806 | A | 11/1998 |
| JP | 11-263612 | A | 9/1999 |
| JP | 2001-283844 | A | 10/2001 |
| JP | 2002-367611 | A | 12/2002 |
| JP | 2012-216521 | A | 11/2012 |
| JP | 2012-216537 | A | 11/2012 |
| JP | 2013-201125 | A | 10/2013 |
| JP | WO2014/103281 | A1 | 7/2014 |
| JP | 2016-184581 | A | 10/2016 |
| JP | 2017-045574 | A | 3/2017 |
| JP | 2020-43069 | A | 3/2020 |
| KR | 10-2006-0051305 | A | 5/2006 |
| KR | 10-2014-0099988 | A | 8/2014 |
| KR | 10-2017-0016710 | A | 2/2017 |
| KR | 10-2017-0065238 | A | 6/2017 |
| KR | 10-2017-0136878 | A | 12/2017 |
| KR | 10-2018-0022489 | A | 3/2018 |
| KR | 10-1965773 | B1 | 4/2019 |
| KR | 10-2019-0101179 | A | 8/2019 |
| WO | WO 2010-041907 | A2 | 4/2010 |
| WO | WO 2012-077653 | A1 | 6/2012 |
| WO | WO 2014-024473 | A1 | 2/2014 |
| WO | WO 2018-012821 | A1 | 1/2018 |
| WO | 2019/016395 | A1 | 1/2019 |

OTHER PUBLICATIONS

Gong Jinbao, et al., "Study on Carbon Materials for Anodes of Lithium-Ion Batteries," Journal of Fudan University (Natural Science), vol. 43, No. 4, Aug. 2004, 7 pages.
Chinese Office Action dated Dec. 1, 2021, issued in Chinese Patent Application No. 201910841285.4 (10 pages).
U.S. Notice of Allowance dated Dec. 1, 2021, issued in U.S. Appl. No. 16/560,522 (9 pages).
EPO Extended European Search Report dated Jan. 24, 2020 for EP Application No. 19195631.7, 10 pages.
EPO Office Action dated Nov. 12, 2020 for EP Application No. 19195631.7, 5 pages.
JPO Office action in JP Application No. 2019-163130 dated Aug. 31, 2020, 4 pages (Japanese only).
Korean Office Action dated Jan. 29, 2021, issued in Korean Patent Application No. 10-2018-0106955 (5 pages).
EPO Extended European Search Report dated Jul. 29, 2021, issued in corresponding European Patent Application No. 21160330.3 (9 pages).
EPO Extended European Search Report dated Jul. 30, 2021, issued in European Patent Application No. 21160335.2 (10 pages).
U.S. Office Action dated Jun. 24, 2021, issued in U.S. Appl. No. 16/560,522 (9 pages).
US Restriction Requirement dated Sep. 13, 2022, issued in U.S. Appl. No. 17/190,863 (5 pages).
Japanese Office Action, with English translation, dated Sep. 5, 2022, issued in Japanese Patent Application No. 2021-147834 (13 pages).
U.S. Office Action dated Nov. 22, 2022, issued in U.S. Appl. No. 17/190,863 (10 pages).

* cited by examiner

1

NEGATIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2020-0026661, filed in the Korean Intellectual Property Office on Mar. 3, 2020, the entire content of which is incorporated herein by reference. This application includes subject matter related to co-pending and commonly owned application filed on the same date as this Application, and to co-pending and commonly owned U.S. application Ser. No. 16/560,522 filed on Sep. 4, 2019, the entire content of each of which is incorporated herein by reference.

BACKGROUND

1. Field

One or more aspects of embodiments of the present disclosure relate to a negative active material for a rechargeable lithium battery and a rechargeable lithium battery including the same.

2. Description of the Related Art

Technologies for high capacity rechargeable lithium batteries are being continuously developed, due to increasing demands on mobile equipment and/or portable batteries.

As for a positive active material of a rechargeable lithium battery, a lithium-transition metal oxide having a structure capable of intercalating lithium ions (such as $LiCoO_2$, $LiMn_2O_4$, $LiNi_{1-x}Co_xO_2$ ($0<x<1$), and/or the like) has been utilized.

As for a negative active material capable of intercalating and deintercalating lithium ions, Si-based active materials including Si and/or Sn, and/or various suitable carbon-based materials including artificial graphite, natural graphite, and/or hard carbon have been utilized.

The information disclosed in this Background section is provided only to enhance understanding of the background of the present disclosure, and does not constitute prior art.

SUMMARY

One or more aspects of embodiments of the present disclosure are directed toward a negative active material for a rechargeable lithium battery exhibiting excellent chargeability and dischargeability (e.g., cycling) characteristics.

One or more aspects of embodiments of the present disclosure are directed toward a rechargeable lithium battery including the negative active material.

One or more embodiments of the present disclosure provide a negative active material for a rechargeable lithium battery, the negative active material including a secondary particle having a core including a plurality of primary particles that are agglomerated, each of the plurality of the primary particles including a natural graphite; and a coating layer including amorphous carbon and around (e.g., surrounding) the core, wherein a Raman peak intensity ratio of a D peak (1350 $cm^{-1}$ to 1370 $cm^{-1}$) to a D' peak (1570 $cm^{-1}$ to 1620 $cm^{-1}$) ($I_D/I_{D'}$) of the negative active material is about 3.2 to about 3.8, and a lattice constant La of the negative active material is about 30 nm to about 45 nm.

In some embodiments, the lattice constant La may be about 40 nm to about 45 nm.

In some embodiments, the natural graphite may be a flake format natural graphite.

In some embodiments, the secondary particle may further include amorphous carbon filled between the primary particles.

In some embodiments, the coating layer may have a thickness of about 5 nm to about 50 nm.

In some embodiments, the core may have a cabbage shape by randomly building up and agglomerating at least one primary particle (e.g., a cabbage shape comprising at least one primary particle, the at least one primary particle being bent, crushed, and spheroidized into a cabbage shape).

In some embodiments, the secondary particle may have a particle diameter about 8 μm to about 24 μm.

One or more embodiments of the present disclosure provide a rechargeable lithium battery including: a negative electrode including: a negative active material; a positive electrode including a positive active material; and an electrolyte between the negative electrode and the positive electrode.

The negative active material for a rechargeable lithium battery according to embodiments of the present disclosure may exhibit desired (excellent) charge rate and/or discharge rate characteristics.

Figure 1:
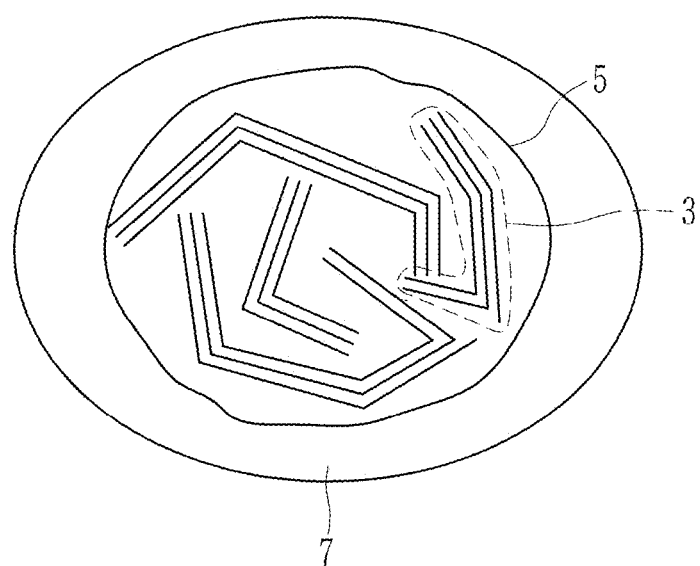
FIG. 1 is a drawing schematically showing a negative active material according to one embodiment.

DETAILED DESCRIPTION hereinafter, embodiments are described in more detail. However, these embodiments are examples, and the present disclosure is not limited thereto and is defined by the scope of the following claims and equivalents thereof.

As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, expressions such as "at least one of," "one of," and "selected from," when preceding a list of elements, modify the entire list of elements and do not modify the individual elements of the list. As used herein, the term "and/or" includes any and all combinations of one or more of the associated listed items. Further, the use of "may" when describing embodiments of the present disclosure refers to "one or more embodiments of the present disclosure".

It will be understood that when an element is referred to as being "on," "connected to," or "coupled to" another element, it may be directly on, connected, or coupled to the other element or one or more intervening elements may also be present. When an element is referred to as being "directly on," "directly connected to," or "directly coupled to" another element, there are no intervening elements present.

A negative active material for a rechargeable lithium battery according to one embodiment of the present disclosure includes: a secondary particle including a core in which a plurality of primary particles are agglomerated, each of the plurality of primary particles including a natural graphite; and a coating layer including amorphous carbon around (e.g., surrounding or substantially surrounding) the core.

In one embodiment, the core is (e.g., refers to) a region positioned inside (e.g., in the interior) of the negative active material, and for example, the core may be a region surrounded by an outer portion such as a coating layer, so that it indicates a region that is not substantially exposed outward (e.g., the core is substantially not exposed to the outside, and/or is not exposed at the outer surface of the particle). For example, a region positioned on the surface portion (outside) of the negative active material is considered (termed or referred) to be a coating layer, and a region positioned inside of the coating layer is considered to be a core.

In a Raman spectrum analysis of the negative active material, a Raman peak intensity ratio of a D peak ($I_D$, 1350 cm$^{-1}$ to 1370 cm$^{-1}$) to a D' peak ($I_{D'}$, 1570 cm$^{-1}$ to 1620 cm$^{-1}$) ($I_D/I_{D'}$) may be about 3.2 to about 3.8, and a lattice constant La may be about 30 nm to about 45 nm. Furthermore, a lattice constant La of the negative active material may be about 35 nm to about 45 nm, or may be about 40 nm to about 45 nm.

When the peak intensity ratio ($I_D/I_{D'}$) of the negative active material satisfies the range of about 3.2 to about 3.8, and the lattice constant La satisfies in the range of about 30 nm to about 45 nm (e.g., concurrently or simultaneously), excellent or suitable charge rate and discharge rate characteristics, including excellent or suitable high-rate charge and discharge characteristics, may be provided. When the peak intensity ratio ($I_D/I_{D'}$) is lower than 3.2 or higher than 3.8, even if the lattice constant La is within the above range, it is not desired or suitable because the charge and/or discharge rate characteristics may be deteriorated. Furthermore, when the lattice constant La is lower than 30 nm or higher than 45 nm, even if the peak intensity ratio ($I_D/I_{D'}$) is within the range, it is not desired or suitable because the charge and/or discharge rate characteristics may be deteriorated. In contrast, when the negative active material according to one embodiment has the peak intensity ratio ($I_D/I_{D'}$) and the lattice constant La that concurrently or simultaneously satisfy their respective ranges, excellent charge and/or discharge rate characteristics, including high-rate charge and/or discharge rate characteristics, may be exhibited. If one of these is not satisfied, the excellent charge and/or discharge rate characteristics may be not obtained.

The term "peak intensity ratio ($I_D/I_{D'}$)" refers to a ratio of a peak intensity ($I_D$) of the D peak (1350 cm$^{-1}$ to 1370 cm$^{-1}$) to a peak intensity ($I_{D'}$) of the D' peak (1570 cm$^{-1}$ to 1620 cm$^{-1}$). In the specification, the Raman spectrum peak intensity may be obtained utilizing a laser of about a 514 nm wavelength or a laser of about a 633 nm wavelength, unless otherwise defined.

According to one embodiment, the peak intensity may be measured by utilizing a laser of about a 514 nm wavelength. The interpretation of the resulting Raman spectrum may be generally classified as a height ratio or an integral area ratio of the peak obtained from the Raman spectrum, and indicates the height ratio in one embodiment of the present disclosure.

The lattice constant La may be measured by an X-ray diffraction (XRD) analysis utilizing CuKα radiation, and the measurement conditions referred to herein may be the same as generally used in the related art. For example, the XRD analysis may be carried out using a power of about 35 kV to about 40 kV, a current of about 90 mA to about 100 mA, a 2θ range of 10° to 90°, a time/step (time per step) of 25 s to 55 s, and a step size (°/step) of 0.01° to 0.02°.

A negative active material according to one embodiment includes a secondary particle including a core in which a plurality of primary particles are agglomerated and each of the plurality of primary particles includes natural graphite, and a coating layer surrounding the core and including amorphous carbon. In some embodiments, each of the plurality of primary particles may include or be laminated with graphene (e.g., a layer of graphene).

In one embodiment, the core may itself be considered a secondary particle having a cabbage shape that is formed by randomly building up and agglomerating at least one primary particle (e.g., the at least one primary particle is agglomerated as in the shape of leaves in a cabbage bulb). For example, the core may include at least one primary particle that is laminated with at least one graphene, and is bent, crushed, and spheroidized (e.g., formed into a spherical shape) so that the surface portion is built up in a cabbage shape, and the central portion is built up in a random pattern (e.g., layered with random offsets around a cylindrical or hemispherical volume) to form a secondary particle.

The number of primary particles constituting the secondary particle (e.g., the core) is not particularly limited as long as a secondary particle is formed, but, for example, may be 2 to 50, 2 to 40, 2 to 30, 2 to 20, 2 to 10, or 2 to 4 primary particles agglomerated to form a secondary particle.

Figure 2:
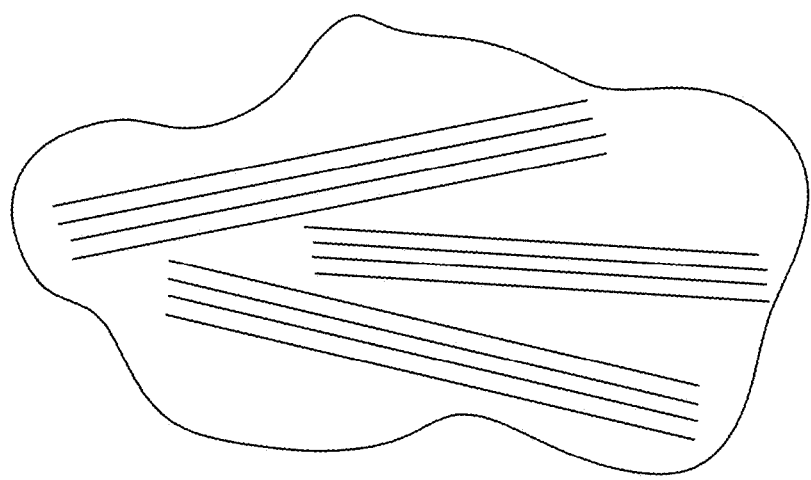
FIG. 2 is a drawing schematically showing a secondary particle of a related art negative active material.

Generally available natural graphite is a huge (e.g., relatively large) particle having a diameter of about 40 μm to 120 μm, and thus, if the outer shape is only spheroidized to form a core without bending and crushing the particle, thereby maintaining the intact plate structures of natural graphite as shown in FIG. 2, the inner structure is not dense, and may form or include pores that may cause a side reaction(s) with the electrolyte and electrode expansion during battery cycling, thereby deteriorating the battery cycle-life characteristics.

In contrast, the core 5 in the negative active material 1 according to one embodiment is one in which the primary particles 3 are laminated with at least one graphene and are spheroidized in the form of bending (e.g., as a result of being bent), that is, the core 5 is agglomerated by building it up as shown in FIG. 1. Accordingly, a size of the natural graphite is reduced to form a dense inner structure, so that the (e.g., number and/or density of) inner pores are minimized or reduced such that side reaction(s) with the electrolyte are reduced, resultantly improving the cycle-life characteristics. FIG. 1 shows a schematic cross section of primary particles 3 included in the secondary particle core, but the inside structure (e.g., structure of the core) of the secondary particle is not limited thereto.

The natural graphite may be flake format natural graphite, and may be desired or suitable because natural graphite has higher crystallinity than artificial graphite, and higher charge and discharge capacity than artificial graphite.

The primary particle may have a particle diameter of about 5 μm to about 15 μm, and for example, a particle diameter of about 5 μm to about 13 μm, about 5 μm to about 12 μm, or about 5.5 μm to about 11.5 μm. Furthermore, the secondary particle may have a particle diameter of about 8 μm to about 24 μm, and for example, a particle diameter of about 10 μm to about 24 μm, about 11 μm to about 24 μm, about 12 μm to about 24 μm, about 13 μm to about 24 μm, about 13 μm to about 23 μm, or about 13 μm to about 20 μm.

When the primary particle and the secondary particle each have particle diameters within the above ranges, the negative active material including them may exhibit effectively suppressed or reduced expansion, and may have an increased tap density. Furthermore, excellent output characteristics may be obtained.

The particle diameters of the primary and secondary particles may each be expressed as an average particle diameter. Flerein, the term "average particle diameter" refers to a value obtained from adding a plurality of particles to a particle size analyzer and measuring, and may, in particular, refer to a particle diameter (D50) at cumulative 50 volume % in a cumulative size-distribution curve of the particles. For example, unless otherwise defined, the term "average particle diameter (D50)" refers to a diameter of particles having a volume of 50% in the cumulative particle size distribution.

The average particle size D50 may be measured by any suitable technique in the art, for example, by utilizing a particle size analyzer, transmission electron microscope (TEM) photography, or scanning electron microscope (SEM) photography. Another method involves utilizing dynamic light scattering to count a number of particles relative to each particle size, and then calculating an average particle diameter D50 from the data.

The negative active material according to one embodiment includes a coating layer 7 surrounding the core and including amorphous carbon, as shown in FIG. 1. Because the negative active material includes the coating layer including amorphous carbon, the natural graphite secondary particle (core) is not exposed outward, and thus the natural graphite may not directly contact the electrolyte, thereby effectively inhibiting or reducing side reaction(s) with the electrolyte.

According to one embodiment, the secondary particle core may further include amorphous carbon filled between the primary particles. When the amorphous carbon is filled between the primary particles, side reaction(s) occurring with electrolyte that is impregnated between the particles may be reduced, and the cycle-life characteristics may be improved.

The amorphous carbon included in the coating layer and/or filled between the primary particles may be or include soft carbon, hard carbon, mesophase pitch carbon, a sintered coke, or a combination thereof.

As such, the amorphous carbon may be present in a form of a coating layer coated on the surface of the core, and also may be present in a form of filing between the primary particles, which may be formed together with the coating layer. When amorphous carbon is present in the coating layer and in the filling between the primary particles, the weight ratio of amorphous carbon in the coating layer to the amorphous carbon filled between the primary particles may be about 95:5 to about 85:15. When the amorphous carbon is present in the negative active material in the above weight ratio, the occurrence of side reaction(s) due to the separate presence of an amorphous carbon lump derived from the excess amorphous carbon may be suppressed. Furthermore, the total amount of the amorphous carbon in the negative active material may be about 10 wt % to about 25 wt % based on a total of 100 wt % of the negative active material, regardless of whether the amorphous carbon is present in the coating layer or in the filling between the primary particles. When the amount of the amorphous carbon is within the range, a suitable active mass density may be realized, and a decreased initial efficiency due to the amorphous carbon may not occur.

The coating layer may have a thickness of about 5 nm to about 50 nm, and according to one embodiment, for example, about 10 nm to about 50 nm or about 20 nm to about 50 nm. When the above range is satisfied, side reaction(s) with the electrolyte may be effectively suppressed, and/or charge and discharge rate characteristics may be improved.

Because the negative active material with the above configuration has a thin coating layer with a thickness of about 5 nm to about 50 nm, as described above, the negative active material may have a substantially similar particle diameter to that of the secondary particle (core) when measured utilizing a particle diameter analyzer.

The negative active material may have an internal pore volume fraction of about 2% or less, and for example, about 1.8% or less, about 1.5% or less, about 1.0% to about 1.5%, or about 1.0% to about 1.3%. When the pore volume fraction of the negative active material is within this range, side reaction(s) with the electrolyte may be reduced to improve the cycle-life characteristics of the rechargeable lithium battery.

In some embodiments, the method for measuring the internal pore volume fraction is as follows: firstly, a rechargeable lithium battery that has been charged and discharged may be disassembled to separate a negative active material layer from the negative electrode. The binder and organic materials included in the negative active material layer may be removed and dried to obtain a natural graphite negative active material in the state of a powder. The pore volume of the natural graphite powder may be measured, and the true density of natural graphite may be multiplied by that measurement to obtain an internal pore volume fraction (%) of the secondary particle. Here, the amorphous carbon remaining at the surface of the natural graphite primary particle (inside of the secondary particle) and the surface of the secondary particle does not necessarily need to be removed, as it has the same true density as natural graphite.

The negative active material may be prepared by the following procedure.

Natural graphite with a particle diameter of about 80 μm or more may be pulverized and granulated to prepare a fine primary particle. The pulverization and granulation may be performed by an airstream grinding method, and the airstream grinding method may be performed by grinding natural graphite at room temperature (20° C. to 25° C.) utilizing an airstream (e.g., airstream pressure) of about 5 kg/cm$^2$ to 20 kg/cm$^2$. The pulverization may be performed for about 1 hour to about 2 hours. When the pulverization is performed within this duration range, a negative active material having the desired or suitable peak intensity ratio ($I_D/I_{D'}$) and the lattice constant La may be prepared. When the pulverization is performed for a shorter or a longer duration than the above range, the desired or suitable peak intensity ratio ($I_D/I_{D'}$) and lattice constant may not be obtained.

The produced fine primary particle may have a particle diameter of about 5 μm to about 15 μm, and for example, about 5 μm to about 13 μm, about 5 μm to about 12 μm, or about 5.5 μm to about 11.5 μm. In some embodiments, a sieving process utilizing a sieve may be further performed to obtain fine primary particles with the desired or suitable particle diameter. For example, a sieving process may be further performed to obtain a fine primary particle having a particle diameter of about 13 μm from within the fine primary particles having a particle diameter in a range of about 10 μm to about 15 μm.

A spheroidization process may be performed by utilizing spheroidization equipment to agglomerate the fine primary particle(s) into a secondary particle. Such a spheroidization process may be performed utilizing general techniques in the related art. Thus, the detailed description will be not illustrated in the specification.

An amorphous carbon precursor may be added to the produced natural graphite secondary particle to mix therewith.

The amorphous carbon precursor is not particularly limited, as long as the material turns to be a carbide (e.g., as long as the material provides an amorphous carbon product), and may include (e.g., be) at least one selected from a phenol resin, a furan resin, an epoxy resin, polyacrylonitrile, a polyamide resin, a polyimide resin, a polyamideimide resin, synthetic pitch, petroleum-based pitch, coal tar-based pitch, pitch carbon, tar, and a combination thereof.

The mixing process may be performed by mixing the natural graphite secondary particle and the amorphous carbon precursor at a weight ratio of about 70:30 to about 90:10 to thereby provide the natural graphite and amorphous carbon at a weight ratio of about 90:10 to about 75:25, e.g., about 90:10 to about 80:20, about 90:10 to about 85:15, or about 90:10 to about 88:12 in the final product.

When the natural graphite primary particle and the amorphous carbon precursor are mixed in the above-described weight ratio range to then include natural graphite and amorphous carbon in the above-described range in the final product, the amount of amorphous carbon added to the inside of the secondary particle (e.g., between the primary particles) may be suitably controlled, and the pores inside of the secondary particle may be reduced to decrease side reaction(s) between the electrolyte solution and to improve the density of the interior (e.g., of the core). During the preparing of the coating layer including amorphous carbon on the surface of the secondary particle, the coating layer with the above thickness range may be realized, and thus, structural stability of the natural graphite secondary particle may be obtained, expansion of the negative active material may be prevented or reduced, and cycle-life characteristics may be improved.

The secondary particle mixed with the amorphous carbon may be sintered (e.g., heat-treated), thereby preparing a negative active material.

The heat treatment procedure may be performed at a temperature of about 1000° C. to about 2000° C., for example, about 1000° C. to about 1800° C., about 1000° C. to about 1600° C., about 1000° C. to about 1400° C., or about 1200° C. to about 1300° C. The heat treatment procedure may be performed for about 1 hour to about 5 hours, for example, about 1 hour to about 4 hours, about 1 hour to about 3 hours, or about 2 hours to about 3 hours.

When the heat treatment procedure is performed in the above temperature range and time range, the inner pore volume of the secondary particle and side reaction(s) with the electrolyte may be reduced, and expansion of the negative active material may be suppressed, thereby improving the cycle-life characteristics.

Another embodiment provides a rechargeable lithium battery including a negative electrode including the negative active material, a positive electrode including a positive active material, and an electrolyte.

The negative electrode may include a current collector and a negative active material layer formed on the current collector.

In the negative active material layer, the negative active material may be included in an amount of 95 wt % to 99 wt % based on the total weight of the negative active material layer.

The negative active material layer may include a binder, and may further optionally include a conductive material. In the negative active material layer, an amount of the binder may be about 1 wt % to about 5 wt % based on the total weight of the negative active material layer. When the negative active material layer further includes a conductive material, the negative active material layer may include about 90 wt % to about 98 wt % of the negative active material, about 1 wt % to about 5 wt % of the binder, and about 1 wt % to about 5 wt % of the conductive material.

The binder may adhere the negative active material particles to each other well and also adhere the negative active material particles to the current collector. The binder may include a non-water-soluble binder, a water-soluble binder, or a combination thereof.

The non-water-soluble binder may be or include ethylene propylene copolymer, polyacrylonitrile, polystyrene, polyvinyl chloride, carboxylated polyvinylchloride, polyvinyl fluoride, polyurethane, polytetrafluoroethylene, polyvinylidene fluoride, polyethylene, polypropylene, polyamideimide, polyimide, lithium polyacrylate, or a combination thereof.

The water-soluble binder may be a styrene-butadiene rubber, an acrylated styrene-butadiene rubber, an acrylonitrile-butadiene rubber, an acryl rubber, a butyl rubber, a fluorine rubber, an ethylene oxide-including polymer, polyvinyl pyrrolidone, polyepichlorohydrin, polyphosphazene, an ethylene propylene diene copolymer, polyvinyl pyridine, chlorosulfonate polyethylene, latex, a polyester resin, an acryl resin, a phenol resin, an epoxy resin, polyvinyl alcohol, or a combination thereof.

When the water-soluble binder is utilized as a negative electrode binder, a cellulose-based compound may be further utilized as a thickener to provide viscosity. The cellulose-based compound may include one or more selected from carboxymethyl cellulose, hydroxypropyl methyl cellulose, methyl cellulose, and alkali metal salts thereof. The alkali metal may be Na, K, or Li. The thickener may be included in an amount of 0.1 parts by weight to 3 parts by weight based on 100 parts by weight of the negative active material.

The conductive material is included to provide electrode conductivity, and any electrically conductive material may be utilized as a conductive material unless it causes an unwanted chemical change. Non-limiting examples of the conductive material include a carbon-based material (such as natural graphite, artificial graphite, carbon black, acetylene black, ketjen black, denka black, a carbon fiber, and/or the like); a metal-based material of a metal powder or a metal fiber including copper, nickel, aluminum, silver, and/ or the like; a conductive polymer (such as a polyphenylene derivative); or a mixture thereof.

The current collector may include at least one selected from a copper foil, a nickel foil, a stainless steel foil, a titanium foil, a nickel foam, a copper foam, a polymer substrate coated with a conductive metal, and a combination thereof, but is not limited thereto.

The positive electrode may include a positive current collector and a positive active material layer formed on the positive current collector. The positive active material may include compounds that reversibly intercalate and deintercalate lithium ions (lithiated intercalation compounds). For example, it may include one or more composite oxides of a metal selected from cobalt, manganese, nickel, and a combination thereof, and lithium. Non-limiting examples include compounds represented by the following chemical formulae. $Li_aA_{1-b}X_bD_2$ ($0.90 \leq a \leq 1.8$, $0 \leq b \leq 0.5$); $Li_aA_{1-b}X_bC_{2-c}D_c$ ($0.90 \leq a \leq 1.8$, $0 \leq b \leq 0.5$, $0 \leq c \leq 0.05$); $Li_aE_{1-b}X_bC_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.5$, $0 \leq \alpha \leq 2$); $Li_aNi_bE_cG'_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG'_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG'_bO_2$ ($0.90 \leq a \leq 1.8$, $0.001 \leq b \leq 0.1$); $Li_aCoG'_bO_2$ ($0.90 \leq a \leq 1.8$, $0.001 \leq b \leq 0.1$); $Li_aMn_{1-b}G'_bO_2$ ($0.90 \leq a \leq 1.8$, $0.001 \leq b \leq 0.1$); $Li_aMn_2G'_bO_4$ ($0.90 \leq a \leq 1.8$, $0.001 \leq b \leq 0.1$); $Li_aMn_{1-g}G'_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $Li_aFePO_4$ ($0.90 \leq a \leq 1.8$).

In the chemical formulae, A is selected from nickel (Ni), cobalt (Co), manganese (Mn), and a combination thereof; X is selected from aluminum (Al), Ni, Co, Mn, chromium (Cr), iron (Fe), magnesium (Mg), strontium (Sr), vanadium (V), a rare earth element, and a combination thereof; D is selected from oxygen (O), fluorine (F), sulfur (S), phosphorus (P), and a combination thereof; E is selected from Co, Mn, and a combination thereof; T is selected from F, S, P, and a combination thereof; G' is selected from Al, Cr, Mn, Fe, Mg, lanthanum (La), cerium (Ce), Sr, V, and a combination thereof; Q is selected from titanium (Ti), molybdenum (Mo), Mn, and a combination thereof; Z is selected from Cr, V, Fe, scandium (Sc), yttrium (Y), and a combination thereof; and J is selected from V, Cr, Mn, Co, Ni, copper (Cu), and a combination thereof.

The compound(s) may have a coating layer on the surface thereof, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound in the coating layer may be amorphous or crystalline. The coating element included in the coating layer may include Mg, Al, Co, potassium (K), nitrogen (Na), calcium (Ca), silicon (Si), Ti, V, tin (Sn), germanium (Ge), gallium (Ga), boron (B), arsenic (As), zirconium (Zr), or a mixture thereof. The coating layer may be disposed (e.g., applied) utilizing any method having no adverse influence on the properties of the positive active material. For example, the method may include any suitable coating method (such as spray coating, dipping, and/or the like) that is available in the related art.

In the positive electrode, an amount of the positive active material may be 90 wt % to 98 wt % based on the total weight of the positive active material layer.

In one embodiment, the positive active material layer may further include a binder and a conductive material. Herein, the amounts of the binder and the conductive material may each be about 1 wt % to about 5 wt %, based on a total amount of the positive active material layer.

The binder may improve the binding properties of the positive active material particles with one another and with a current collector. Non-limiting examples of the binder include polyvinyl alcohol, carboxymethyl cellulose, hydroxypropyl cellulose, diacetyl cellulose, polyvinylchloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The conductive material is included to provide electrode conductivity. Any suitable electrically conductive material may be utilized as a conductive material unless it causes an unwanted chemical change in a battery. Non-limiting examples of the conductive material include a carbon-based material (such as natural graphite, artificial graphite, carbon black, acetylene black, ketjen black, a carbon fiber, and/or the like); a metal-based material of a metal powder and/or a metal fiber including copper, nickel, aluminum, silver, and/or the like; a conductive polymer (such as a polyphenylene derivative); or a mixture thereof.

The current collector may be an aluminum foil, a nickel foil, or a combination thereof, but is not limited thereto.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, t-butyl acetate, methyl propionate, ethyl propionate, propyl propionate, γ-butyrolactone, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. The ketone-based solvent may include cyclohexanone and/or the like. The alcohol-based solvent may include ethanol, isopropyl alcohol, and/or the like, and the aprotic solvent may include nitriles (such as R—CN (wherein R is a hydrocarbon group having a C2 to C20 linear, branched, or cyclic structure and may include a double bond, an aromatic ring, or an ether bond) and/or the like), dioxolanes (such as 1,3-dioxolane and/or the like), and/or sulfolanes and/or the like.

The non-aqueous organic solvent may be utilized alone or in a mixture. When the non-aqueous organic solvent is utilized in a mixture, the mixture ratio may be controlled in accordance with a desirable battery performance.

The carbonate-based solvent may include a mixture with a cyclic carbonate and a linear (chain) carbonate. The cyclic carbonate and linear carbonate may be mixed together in a volume ratio of 1:1 to 1:9, which may provide enhanced performance of an electrolyte.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1.

Chemical Formula 1

In Chemical Formula 1, $R_1$ to $R_6$ may be the same or different and may each independently be selected from hydrogen, a halogen, a $C_1$ to $C_{10}$ alkyl group, a haloalkyl group, and a combination thereof.

Non-limiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and/or a combination thereof.

The electrolyte may further include vinylene carbonate and/or an ethylene carbonate-based compound represented by Chemical Formula 2 in order to improve battery cycle-life.

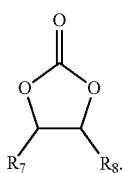

Chemical Formula 2

In Chemical Formula 2, $R_7$ and $R_8$ may be the same or different, and may each independently be selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not concurrently (e.g., simultaneously) hydrogen.

Non-limiting examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and/or the like. When such an additive for improving cycle-life is further utilized, the amount may be controlled within an appropriate or suitable range.

The lithium salt dissolved in an organic solvent supplies a battery with lithium ions, basically operates the rechargeable lithium battery, and improves transportation of the lithium ions between positive and negative electrodes. Non-limiting examples of the lithium salt include at least one supporting salt selected from $LiPF_6$, $LiBF_4$, $LiSbF_6$, $LiAsFe$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example an integer of 1 to 20), LiCl, LiI, and $LiB(C_2O_4)_2$ (lithium bis(oxalato) borate; LiBOB). A concentration of the lithium salt may range from 0.1 M to 2.0 M. When the lithium salt is included at the above concentration range, an electrolyte may have excellent performance and/or lithium ion mobility due to optimal or suitable electrolyte conductivity and/or viscosity.

In some embodiments, a separator may be disposed between the positive electrode and the negative electrode depending on the format of the rechargeable lithium battery. Such a separator may include polyethylene, polypropylene, polyvinylidene fluoride, and multi-layers thereof (such as a polyethylene/polypropylene double-layered separator, a polyethylene/polypropylene/polyethylene triple-layered separator, or a polypropylene/polyethylene/polypropylene triple-layered separator).

Figure 3:
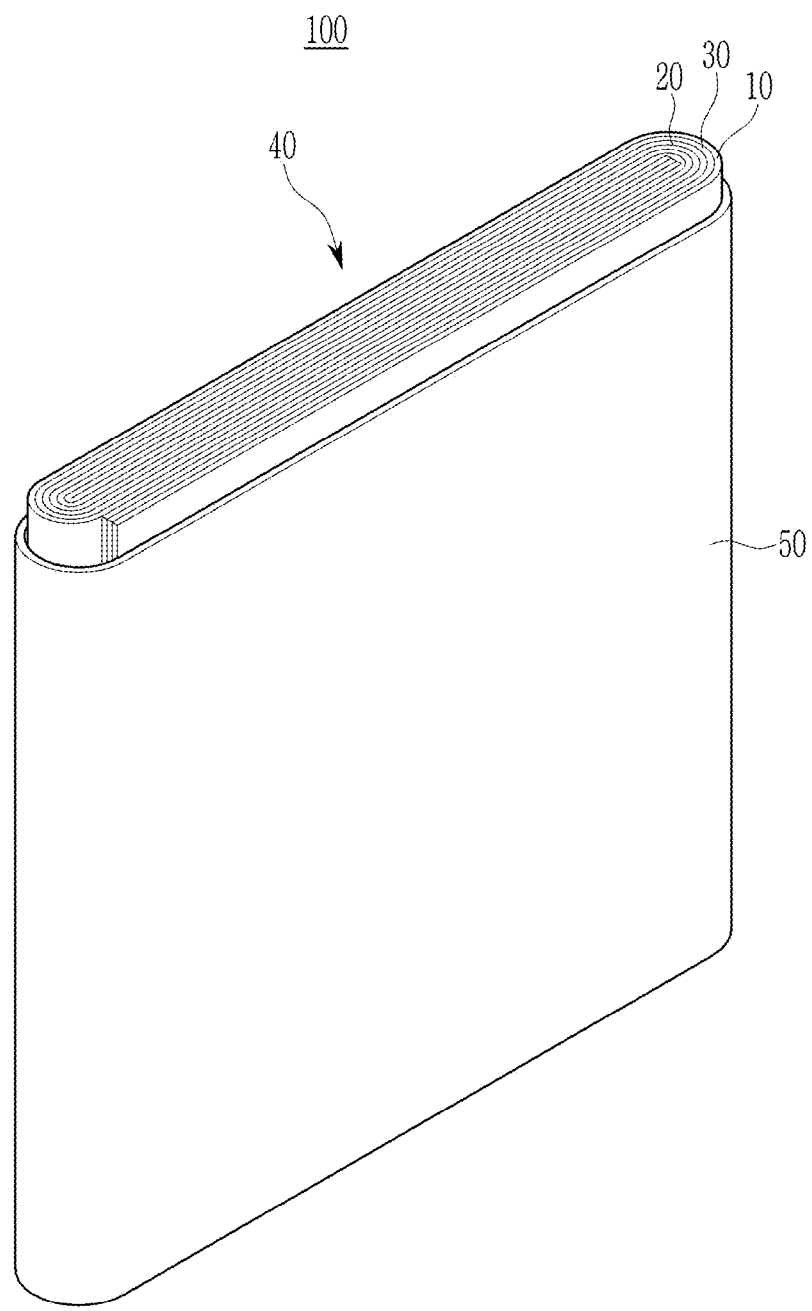
FIG. 3 a drawing schematically showing a structure of the rechargeable lithium battery according to one embodiment.

FIG. 3 is an exploded perspective view of a rechargeable lithium battery according to an embodiment. The rechargeable lithium battery according to an embodiment is illustrated as a prismatic battery, but is not limited thereto, and may include variously-shaped batteries (such as a cylindrical battery, a pouch format battery, and/or the like).

Referring to FIG. 3, a rechargeable lithium battery 100 according to an embodiment includes a wound electrode assembly 40 including a positive electrode 10, a negative electrode 20, and a separator 30 disposed therebetween, and a case 50 housing the electrode assembly 40. The positive electrode 10, the negative electrode 20, and the separator 30 may be impregnated with an electrolyte solution.

Hereinafter, examples of the present disclosure and comparative examples are described. However, the present disclosure is not limited to examples.

Example 1

Natural graphite with an average particle diameter D50 of 80 μm was airstream ground at 25° C. under a condition of 20 kg/cm² for 1 hour to prepare a fine primary particle with an average particle diameter D50 of 11 μm. Using the fine primary particle and spheroidization equipment (product name: F500), a secondary particle with an average particle diameter D50 of 19.7 μm was prepared.

The secondary particle was mixed with a pitch carbon (as an amorphous carbon precursor) at a weight ratio of 70:30, and then the mixture was heat-treated in a 1200° C. sintering furnace for 2 hours to prepare a negative active material. The prepared negative active material included a secondary particle core agglomerated with natural graphite primary particles, a soft carbon amorphous carbon coating layer surrounding the core, and soft carbon amorphous carbon filled between the primary particles. The core had a cabbage shape by randomly building up and agglomerating one or more primary particles, and was positioned on the inside, and the coating layer surrounded the core and was positioned on a surface portion of the particle (e.g., outward). In the prepared active material, the thickness of the carbon amorphous carbon coating layer was 27 nm.

The negative active material in an amount of 97.5 wt %, carboxymethyl cellulose in an amount of 1.0 wt %, and styrene-butadiene rubber in an amount of 1.5 wt % were mixed in distilled water to prepare a negative active material slurry composition.

The negative active material slurry composition was coated on a Cu current collector and dried, followed by compressing to prepare a negative electrode for a rechargeable lithium battery.

A half-cell was fabricated from the negative electrode, a lithium metal counter electrode, and an electrolyte solution. As the electrolyte solution, 1 M $LiPF_6$ dissolved in a mixed solvent of ethylene carbonate and dimethyl carbonate (3:7 volume ratio) was utilized.

Example 2

Natural graphite with an average particle diameter D50 of 80 μm was airstream ground at 25° C. under a condition of 20 kg/cm² for 1 hour to prepare a fine primary particle with an average particle diameter D50 of 11 μm. Using the fine primary particle and spheroidization equipment (product name: F500), a secondary particle with an average particle diameter D50 of 22.6 μm was prepared.

The secondary particle was mixed with a pitch carbon (as an amorphous carbon precursor) at a weight ratio of 75:25, and then the mixture was heat-treated in a 1200° C. sintering furnace for 2 hours to prepare a negative active material. The prepared negative active material included a secondary particle core agglomerated with natural graphite primary particles, a soft carbon amorphous carbon coating layer surrounding the core, and soft carbon amorphous carbon filled between the primary particles. The core had a cabbage shape by randomly building up and agglomerating one or more primary particles and was positioned on the inside, and the coating layer surrounded the core and was positioned on a surface portion of the particle (e.g., outward). In the prepared active material, the thickness of the carbon amorphous carbon coating layer was 38 nm.

A half-cell was fabricated from the negative active material by substantially the same procedure as in Example 1.

Example 3

Natural graphite with an average particle diameter D50 of 80 μm was airstream ground at 25° C. under a condition of 20 kg/cm² for 1 hour to prepare a fine primary particle with an average particle diameter D50 of 10 μm. Using the fine primary particle and spheroidization equipment (product name: F500), a secondary particle with an average particle diameter D50 of 18.3 μm was prepared.

The secondary particle was mixed with a pitch carbon (as an amorphous carbon precursor) at a weight ratio of 75:25, and then the mixture was heat-treated in a 1200° C. sintering furnace for 2 hours to prepare a negative active material. The prepared negative active material included a secondary particle core agglomerated with natural graphite primary particles, a soft carbon amorphous carbon coating layer surrounding the core, and soft carbon amorphous carbon filled between the primary particles. The core had a cabbage shape by randomly building up and agglomerating one or more primary particles and was positioned on the inside, and the coating layer surrounded the core and was positioned on a surface portion of the particle (e.g., outward). In the prepared active material, the thickness of the carbon amorphous carbon coating layer was 46 nm.

A half-cell was fabricated from the negative active material by substantially the same procedure as in Example 1.

Example 4

Natural graphite with an average particle diameter D50 of 80 μm was airstream ground at 25° C. under a condition of 25 kg/cm² for 1 hour to prepare a fine primary particle with an average particle diameter D50 of 9 μm. Using the fine primary particle and spheroidization equipment (product name: F500), a secondary particle with an average particle diameter D50 of 13.5 μm was prepared.

The secondary particle was mixed with a pitch carbon (as an amorphous carbon precursor) at a weight ratio of 70:30, and then the mixture was heat-treated in a 1200° C. sintering furnace for 2 hours to prepare a negative active material. The prepared negative active material included a secondary particle core agglomerated with natural graphite primary particles, a soft carbon amorphous carbon coating layer surrounding the core, and soft carbon amorphous carbon filled between the primary particles. The core had a cabbage shape by randomly building up and agglomerating at least one or more primary particles and was positioned on the inside, and the coating layer surrounded the core and was positioned on a surface portion of the particle (e.g., outward). In the prepared active material, the thickness of the carbon amorphous carbon coating layer was 15 nm.

A half-cell was fabricated from the negative active material by substantially the same procedure as in Example 1.

Example 5

Natural graphite with an average particle diameter D50 of 80 μm was airstream ground at 25° C. under a condition of 25 kg/cm² for 2 hours to prepare a fine primary particle with an average particle diameter D50 of 8 μm. Using the fine primary particle and spheroidization equipment (product name: F500), a secondary particle with an average particle diameter D50 of 8.7 μm was prepared.

The secondary particle was mixed with a pitch carbon (as an amorphous carbon precursor) at a weight ratio of 70:30, and then the mixture was heat-treated in a 1200° C. sintering furnace for 2 hours to prepare a negative active material. The prepared negative active material included a secondary particle core agglomerated with natural graphite primary particles, a soft carbon amorphous carbon coating layer surrounding the core, and soft carbon amorphous carbon filled between the primary particles. The core had a cabbage shape by randomly building up and agglomerating one or more primary particles and was positioned on the inside, and the coating layer surrounded the core and was positioned on a surface portion of the particle (e.g., outward). In the prepared active material, the thickness of the carbon amorphous carbon coating layer was 22 nm.

A half-cell was fabricated from the negative active material by substantially the same procedure as in Example 1.

Example 6

Natural graphite with an average particle diameter D50 of 80 μm was airstream ground at 25° C. under a condition of 25 kg/cm² for 1 hour to prepare a fine primary particle with an average particle diameter D50 of 9 μm. Using the fine primary particle and spheroidization equipment (product name: F500), a secondary particle with an average particle diameter D50 of 15.2 μm was prepared.

The secondary particle was mixed with a pitch carbon (as an amorphous carbon precursor) at a weight ratio of 75:25, and then the mixture was heat-treated in a 1200° C. sintering furnace for 2 hours to prepare a negative active material. The prepared negative active material included a secondary particle core agglomerated with natural graphite primary particles, a soft carbon amorphous carbon coating layer surrounding the core, and soft carbon amorphous carbon filled between the primary particles. The core had a cabbage shape by randomly building up and agglomerating one or more primary particles and was positioned on the inside, and the coating layer surrounded the core and was positioned on a surface portion of the particle (e.g., outward). In the prepared active material, the thickness of the carbon amorphous carbon coating layer was 7 nm.

A half-cell was fabricated from the negative active material by substantially the same procedure as in Example 1.

Comparative Example 1

Natural graphite with an average particle diameter D50 of 80 μm was airstream ground at 25° C. under a condition of 10 kg/cm² for 30 minutes to prepare a fine primary particle with an average particle diameter D50 of 18 μm. Using the fine primary particle and spheroidization equipment (product name: F500), a secondary particle with an average particle diameter D50 of 29.6 μm was prepared.

The secondary particle was mixed with a pitch carbon (as an amorphous carbon precursor) at a weight ratio of 80:20, and then the mixture was heat-treated in a 1200° C. sintering furnace for 2 hours to prepare a negative active material. The prepared negative active material included a secondary particle core agglomerated with natural graphite primary particles, a soft carbon amorphous carbon coating layer surrounding the core, and soft carbon amorphous carbon filled between the primary particles. The core had a cabbage shape by randomly building up and agglomerating one or more primary particles and was positioned on the inside and the coating layer surrounded the core and was positioned on a surface portion of the particle (e.g., outward). In the prepared active material, the thickness of the carbon amorphous carbon coating layer was 78 nm.

A half-cell was fabricated from the negative active material by substantially the same procedure as in Example 1.

Comparative Example 2

Natural graphite with an average particle diameter D50 of 120 μm was airstream ground at 25° C. under a condition of 10 kg/cm² for 30 minutes to prepare a fine primary particle with an average particle diameter D50 of 18 μm. Using the fine primary particle and spheroidization equipment (product name: F500), a secondary particle with an average particle diameter D50 of 28.0 μm was prepared.

The secondary particle was mixed with a pitch carbon (as an amorphous carbon precursor) at a weight ratio of 80:20, and then the mixture was heat-treated in a 1200° C. sintering furnace for 2 hours to prepare a negative active material. The prepared negative active material included a secondary particle core agglomerated with natural graphite primary particles, a soft carbon amorphous carbon coating layer surrounding the core, and soft carbon amorphous carbon filled between the primary particles. The core had a cabbage shape by randomly building up and agglomerating one or more primary particles and was positioned on the inside, and the coating layer surrounded the core and was positioned on a surface portion of the particle (e.g., outward). In the prepared active material, the thickness of the carbon amorphous carbon coating layer was 26 nm.

A half-cell was fabricated from the negative active material by substantially the same procedure as in Example 1.

Comparative Example 3

Natural graphite with an average particle diameter D50 of 100 μm was airstream ground at 25° C. under a condition of 10 kg/cm² for 30 minutes to prepare a fine primary particle with an average particle diameter D50 of 16 μm. Using the fine primary particle and spheroidization equipment (product name: F500), a secondary particle with an average particle diameter D50 of 25.2 μm was prepared.

The secondary particle was mixed with a pitch carbon (as an amorphous carbon precursor) at a weight ratio of 75:25, and then the mixture was heat-treated in a 1200° C. sintering furnace for 2 hours to prepare a negative active material. The prepared negative active material included a secondary particle core agglomerated with natural graphite primary particles, a soft carbon amorphous carbon coating layer surrounding the core, and soft carbon amorphous carbon filled between the primary particles. The core had a cabbage shape by randomly building up and agglomerating one or more primary particles and was positioned on the inside, and the coating layer surrounded the core and was positioned on a surface portion of the particle (e.g., outward). In the prepared active material, the thickness of the carbon amorphous carbon coating layer was 33 nm.

A half-cell was fabricated from the negative active material by substantially the same procedure as in Example 1.

Comparative Example 4

Natural graphite with an average particle diameter D50 of 80 μm was airstream ground at 25° C. under a condition of 10 kg/cm² for 20 minutes to prepare a fine primary particle with an average particle diameter D50 of 16 μm. Using the fine primary particle and spheroidization equipment (product name: F500), a secondary particle with an average particle diameter D50 of 26.1 μm was prepared.

The secondary particle was mixed with a pitch carbon (as an amorphous carbon precursor) at a weight ratio of 75:25, and then the mixture was heat-treated in a 1200° C. sintering furnace for 2 hours to prepare a negative active material. The prepared negative active material included a secondary particle core agglomerated with natural graphite primary particles, a soft carbon amorphous carbon coating layer surrounding the core, and soft carbon amorphous carbon filled between the primary particles. The core had a cabbage shape by randomly building up and agglomerating one or more primary particles and was positioned on the inside, and the coating layer surrounded the core and was positioned on a surface portion of the particle (e.g., outward). In the prepared active material, the thickness of the carbon amorphous carbon coating layer was 31 nm.

A half-cell was fabricated from the negative active material by substantially the same procedure as in Example 1.

SEM Imaging

Figure 4A:
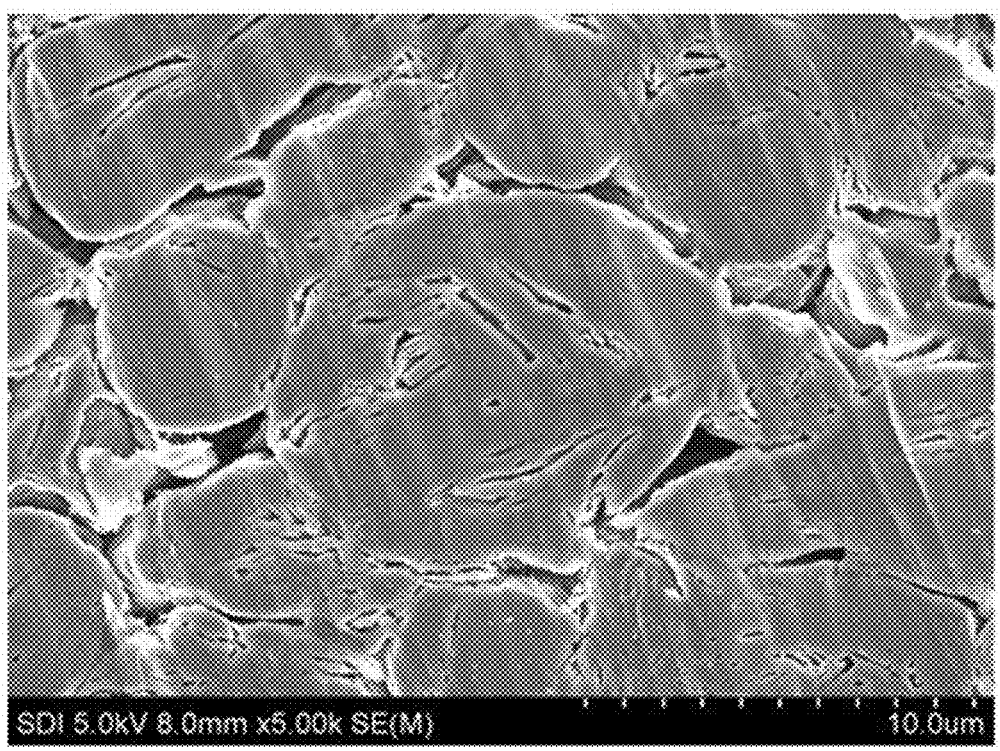
FIG. 4A is a scanning electron microscopy (SEM) image of a negative active material according to Example 1.
Figure 4B:
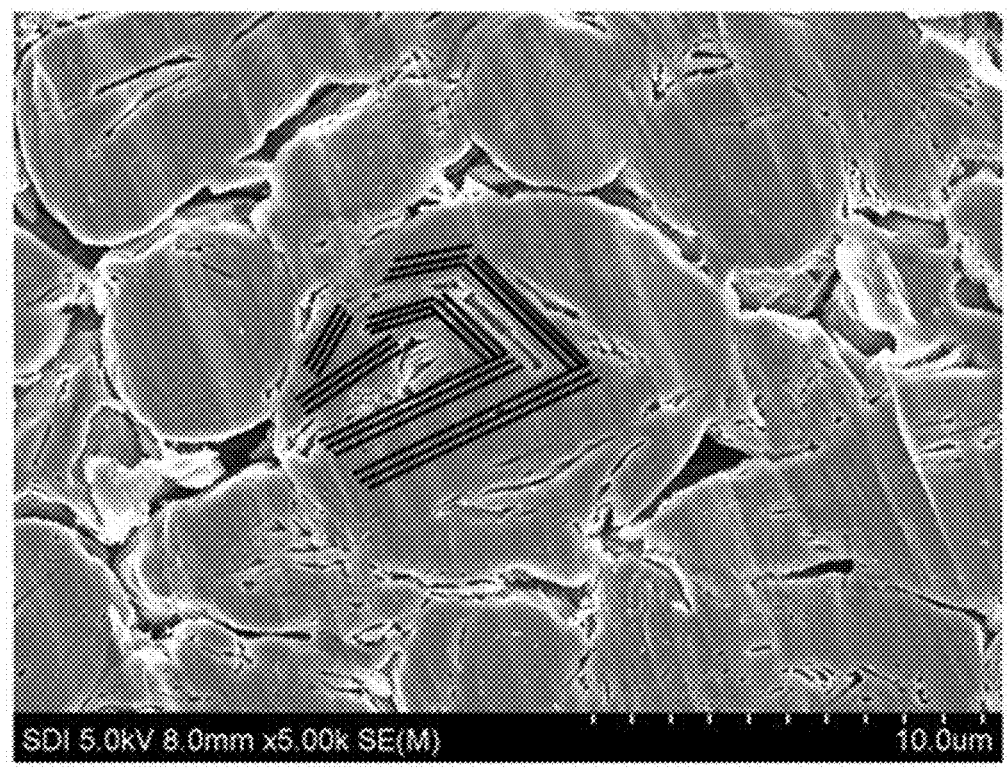
FIG. 4B is a drawing showing a structure of the negative active material of FIG. 1 added to the SEM image of FIG. 4A.
Figure 5A:
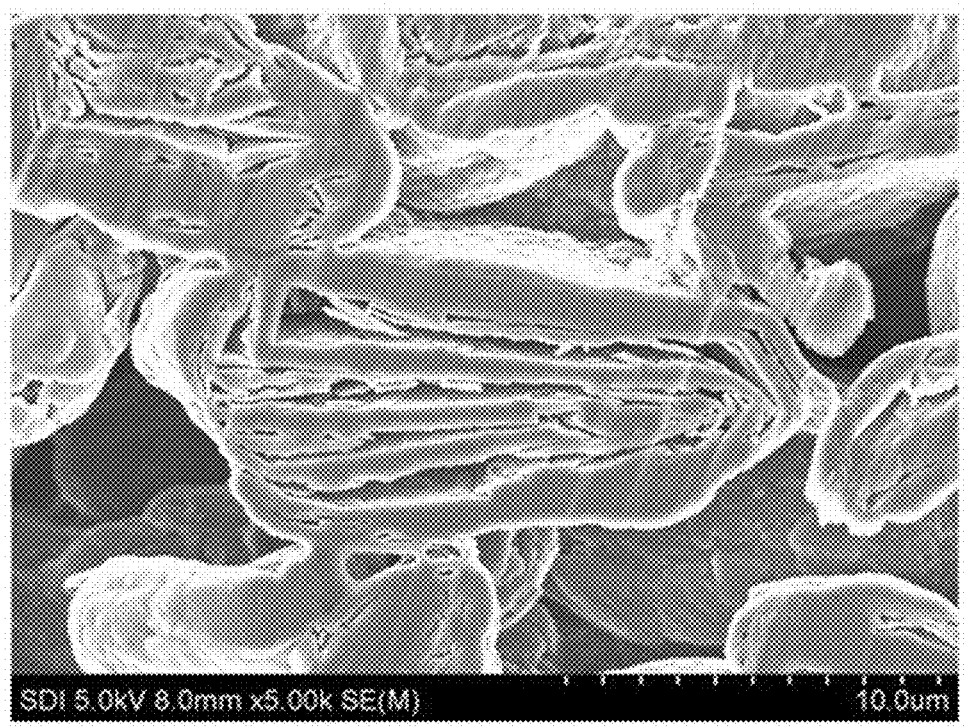
FIG. 5A is a SEM image of the negative active material according to Comparative Example 1.

SEM images for the negative active materials according to Example 1 and Comparative Example 1 are shown in FIG. 4A and FIG. 5A, respectively. The same images overlaid with a schematic drawing of the negative active materials of FIG. 1 and FIG. 2 are shown in FIG. 4B and FIG. 5B, respectively.

As shown in FIG. 4A and FIG. 4B, the negative active material according to Example 1 had an agglomeration shape by spheroidizing the primary particles on which graphenes were laminated in a random bending state, that is, had a cabbage shape by building up and agglomerating to form a dense internal structure, and very small pores.

Figure 5B:
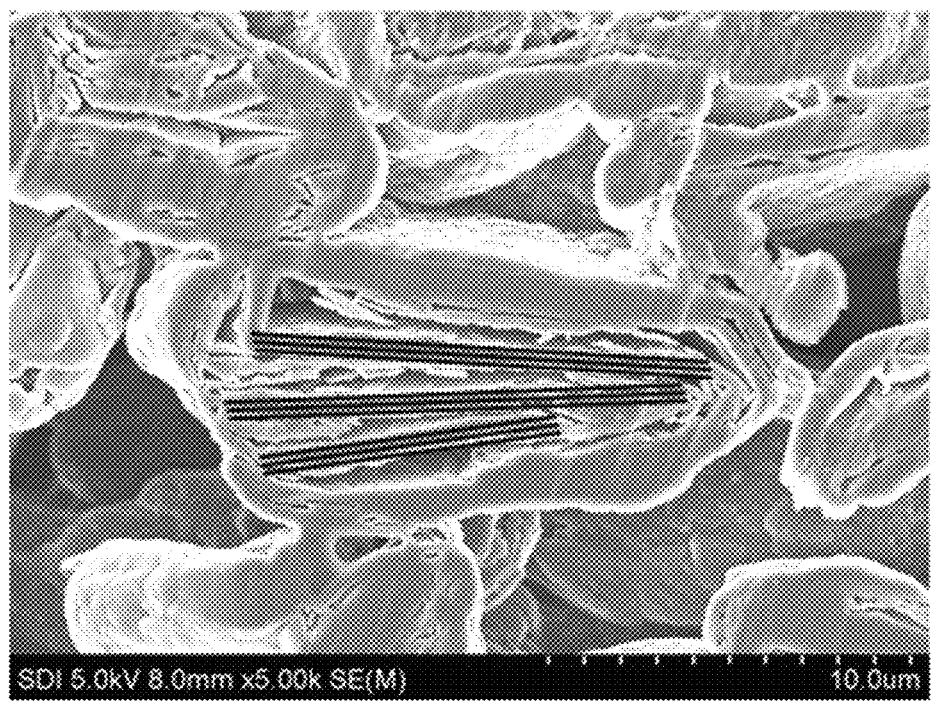
FIG. 5B is a drawing showing a structure of the negative active material of FIG. 2 added to the SEM image of FIG. 5A.

However, as shown in FIG. 5A and FIG. 5B, the negative active material according to Comparative Example 1 had large particles and an agglomerated shape by spheroidizing only outward (e.g., only the outward portion) while a plate shape of the primary particles was maintained, so that the secondary particle had a low density internal (inner) structure and very large pores.

Measurement of Raman Spectrum

Raman spectra of the negative active materials according to Examples 1 to 6 and Comparative Examples 1 to 4 was measured utilizing a 514 nm wavelength laser and a peak intensity ratio ($I_D/I_{D'}$) of a D peak (1350 cm$^{-1}$) to a D' peak (1620 cm$^{-1}$) was obtained. The results are shown in Table 1.

Measurement of Lattice Constant La

Lattice constants La of the negative active materials according to Examples 1 to 6 and Comparative Examples 1 to 4 were obtained by measuring X-ray diffraction utilizing CuKα radiation.

The X-ray diffraction was measured under parameters 2θ=10° to 90°, a power of 40 kV and 100 mA, time/step (time per step) 27.41 s, and a step size (°/step) of 0.013°.

Evaluation of Charge Rate and Discharge Rate Characteristic

The half-cells according to Examples 1 to 6 and Comparative Examples 1 to 4 were charged and discharged at 0.2 C once, at 2.0 C once, and at 3.0 C once to measure the charge and discharge capacities. The ratio of the 2.0 C charge capacity to the 0.2 C charge capacity is shown as the charge rate characteristic, and the ratio of the 3.0 C discharge capacity to the 0.2 C discharge capacity is shown as the discharge rate characteristic. The results are shown in Table 1.

natural graphite as a core, each have a peak intensity ratio ($I_D/I_{D'}$) within the range of 3.2 to 3.8, and a lattice constant La of 30 nm to 45 nm, and thus exhibited excellent charge rate and discharge rate characteristics (e.g., in comparison to the Comparative Examples).

In contrast, Comparative Example 1 utilizing a negative active material, despite including natural graphite as a core, having a high peak intensity ratio ($I_D/I_{D'}$) of 5.2, and having a high lattice constant La of 60.69 nm, exhibited surprisingly deteriorated charge rate and discharge rate characteristics. Comparative Example 2 utilizing a negative active material including a natural graphite as a core, having a high peak intensity ratio ($I_D/I_{D'}$) of 6.6 and having a lattice constant La of 57.82 nm, also exhibited deteriorated charge rate and discharge rate characteristics.

Comparative Example 3 utilizing a negative active material including natural graphite as a core and having a lattice constant La of 35.11 nm, but a high peak intensity ratio ($I_D/I_{D'}$) of 4.9, exhibited abruptly deteriorated charge rate and discharge rate characteristics.

Furthermore, Comparative Examples 4 utilizing natural graphite as a core and having a peak intensity ratio ($I_D/I_{D'}$) of 3.4, but having a lattice constant La of a large value of 58.26 nm, exhibited deteriorated charge rate and discharge rate characteristics.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed

TABLE 1

|  | Type of graphite | Peak intensity ratio ($I_D/I_{D'}$) | Lattice constant (La, nm) | Charge rate characteristic (%) | Discharge rate characteristic (%) |
| --- | --- | --- | --- | --- | --- |
| Example 1 | natural graphite | 3.4 | 34.13 | 44 | 99 |
| Example 2 | natural graphite | 3.3 | 36.77 | 39 | 96 |
| Example 3 | natural graphite | 3.2 | 32.61 | 42 | 98 |
| Example 4 | natural graphite | 3.5 | 41.08 | 36 | 95 |
| Example 5 | natural graphite | 3.2 | 43.12 | 43 | 98 |
| Example 6 | natural graphite | 3.3 | 37.32 | 37 | 96 |
| Comparative Example 1 | natural graphite | 5.2 | 60.69 | 24 | 85 |
| Comparative Example 2 | natural graphite | 6.6 | 57.82 | 28 | 87 |
| Comparative Example 3 | natural graphite | 4.9 | 35.11 | 25 | 85 |
| Comparative Example 4 | natural graphite | 3.4 | 58.26 | 31 | 89 |

As shown in Table 1, the half-cells according to Examples 1 to 6, which utilize negative active materials each including within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this present disclosure has been described in connection with what is presently considered to be practical example embodiments, it is to be understood that the present disclosure is not limited to the disclosed embodiments. On the contrary, it is intended to cover one or more suitable modifications and equivalent arrangements included within the spirit and scope of the appended claims and their equivalents.

What is claimed is:

1. A negative active material for a rechargeable lithium battery, the negative active material comprising:
    a secondary particle comprising a core, the core comprising a plurality of primary particles that are agglomerated, each of the plurality of primary particles comprising a natural graphite; and
    a coating layer comprising amorphous carbon and surrounding the core,
    wherein a Raman peak intensity ratio of a D peak (1350 cm$^{-1}$ to 1370 cm$^{-1}$) to a D' peak (1570 cm$^{-1}$ to 1620 cm$^{-1}$) ($I_D/I_{D'}$) of the negative active material is about 3.2 to about 3.8, and
    a lattice constant La of the negative active material is about 30 nm to about 45 nm.

2. The negative active material of claim 1, wherein the lattice constant La is about 40 nm to about 45 nm.

3. The negative active material of claim 1, wherein the natural graphite is a flake format natural graphite.

4. The negative active material of claim 1, wherein the core further comprises the amorphous carbon between the primary particles.

5. The negative active material of claim 1, wherein the coating layer has a thickness of about 5 nm to about 50 nm.

6. The negative active material of claim 1, wherein the core has a cabbage shape comprising at least one primary particle of the plurality of primary particles, the at least one primary particle being bent, crushed, and spheroidized.

7. The negative active material of claim 1, wherein the secondary particle has a particle diameter about 8 μm to about 24 μm.

8. A rechargeable lithium battery, comprising:
    a negative electrode comprising the negative active material of claim 1;
    a positive electrode comprising a positive active material; and
    an electrolyte between the negative electrode and the positive electrode.

9. A method of manufacturing the negative active material of claim 1, the method comprising:
    forming the core, the forming of the core comprising providing natural graphite as the plurality of the primary particles and agglomerating the plurality of primary particles; and
    coating the core with amorphous carbon as the coating layer surrounding the core.

10. A method of manufacturing a lithium battery, the method comprising:
    providing a negative electrode comprising the native active material manufactured according to claim 9;
    providing a positive electrode comprising a positive active material; and
    providing an electrolyte to the negative electrode and the positive electrode.

* * * * *